Patented Mar. 10, 1953

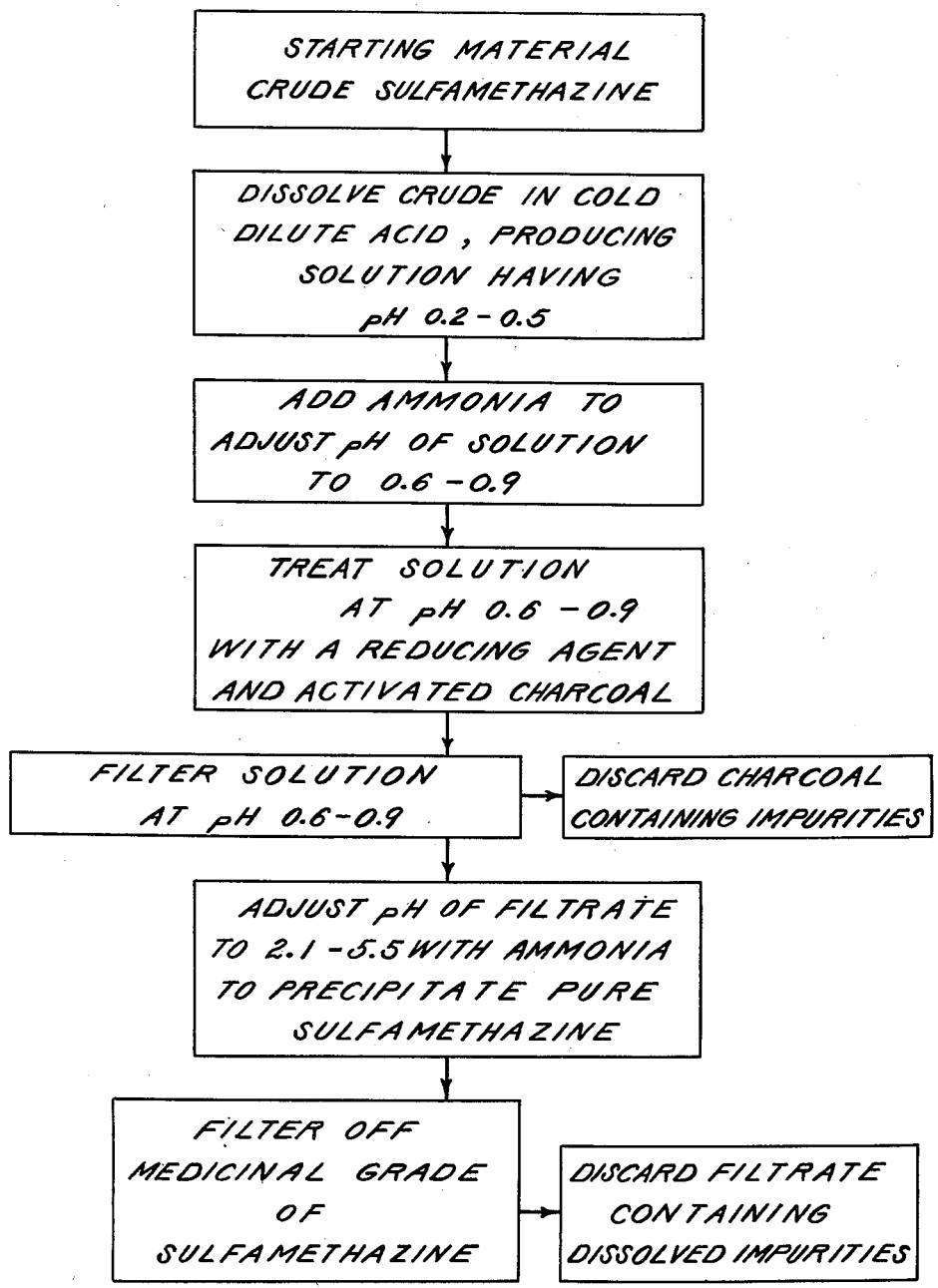

2,631,147

UNITED STATES PATENT OFFICE 2,631,147

PREPARATION OF MEDICINAL GRADE SULFAMETHAZINE

George Austin Ingham, Elmira, Ontario, Canada, assignor to United States Rubber Company, New York, N. Y., a corporation of New Jersey Application August 28, 1951, Serial No. 244,028

4 Claims. (Cl. 260—239.75)

1

This invention relates to an improved method for purifying crude sulfamethazine to produce a medicinal grade of sulfamethazine.

Sulfamethazine is a white crystalline compound having the structural formula:

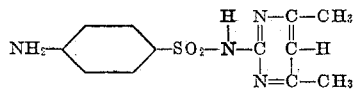

and melting at 198° C. It is one of the outstanding chemotherapeutic agents developed during the last few years for the control of bacterial infections in humans and animals. Cecal Coccidiosis of chickens is also prevented or cured by the use of this sulfonamide. For these uses it must be purified to certain specified standards not readily attainable economically by the prior art purification methods. It is an object of this invention to provide a means whereby sulfamethazine may be conveniently and readily purified to meet the standards required of sulfamethazine that is to be used for medicinal purposes.

Crude sulfamethazine as manufactured by conventional methods is obtained in a rather impure form, being contaminated especially with varying amounts of colored materials. These may be due to oxidized products or metallic salts of the materials used in the synthesis. Such impurities are especially likely to occur in large scale commercial operations where relatively impure starting materials are used or where contaminants may be introduced from the equipment used. The presence of these impurities necessitates further purification in order that the final product may meet the accepted standards for medicinal uses. These standards require that the sulfamethazine shall have a melting point in the range from 196 to 199° C., a residual ash of less than 0.1%, and the product must be a pure white in color According to the present invention, crude sulfamethazine can be purified by dissolving it in a mineral acid, and treating the resultant solution with a water soluble reducing agent and activated charcoal. Partial neutralization of the solution with alkali precipitates a white crystalline powder which meets the standards required for medicinal purposes.

In the accompanying drawing, the flow diagram represents the essential steps in a typical embodiment of the invention.

This method offers many advantages over those of the prior art. In the ordinary method, sulfamethazine is recrystallized from a suitable

2 solvent, the hot solution having been treated with decolorizing charcoal. This method does not produce sulfamethazine of medicinal grade unless it is repeated, and the losses of yield involved make this method prohibitively costly. Purification of sulfamethazine may also be carried out by adding a water soluble alkali dithionite to a hot alkaline solution of the sulfonamide, followed by treatment at 90° C. with activated charcoal. These procedures involve losses of economy through the expense of heating and cooling, solvent loss, and the loss of product in the mother liquor. The yield obtained by these methods is substantially lower than the yield obtained by my method of purification, and the product is not always as pure as is desired. Due to the high unit of cost of manufacturing this chemical, relatively small losses thereof represent considerable economic loss and it is therefore of utmost importance to obtain the maximum yield.

The invention has particular application to purification of crude sulfamethazine obtained from the reaction of technical grade (or recovered) sulfaguanidine, which usually contains ferric oxide as well as organic impurities, with acetyl acetone, after washing the reaction product with hot water. Such a crude is generally of a light grey color, and may have a melting point as low as 194° C. This crude ordinarily contains little or no unreacted sulfaguanidine but contains other organic and inorganic impurities. When this sulfamethazine crude is manufactured in metallic equipment, especially ferrous equipment, the crude is contaminated with ferric oxide, and organo metallic compounds, especially the iron salt of acetyl acetone, since acetyl acetone attacks iron quite readily. This salt is red colored. Additionally, acetyl acetone attacks stainless steel slowly, and small amounts of the chromium salt of acetyl acetone, which is also red in color, contaminate the crude when stainless steel equipment is used. The prior art purification methods have proven particularly unsuitable with crude sulfamethazine of the foregoing character.

In the process of this invention the crude sulfamethazine is dissolved in dilute acid to produce initially a solution having a pH within the range from 0.3 to 1.2. It is preferable that the solution be adjusted to pH 0.6 to 0.9. If necessary, a small amount of a suitable alkali, such as ammonium hydroxide, is added to produce this pH. Solutions which are more acidic than pH 0.6 tend to precipitate the acid salts of sulfamethazine whereas at pH's above 0.9, an excessive amount of sulfamethazine is absorbed by the charcoal. A water soluble reducing agent effective in acid solution and an activated charcoal are then added, and the mixture is agitated. Upon filtering off the charcoal and partially neutralizing the resultant solution with an alkali such as ammonia or sodium hydroxide, an excellent yield of white crystalline powder melting at 196–199° C. is obtained.

Suitable inexpensive acids are the mineral acids, especially hydrochloric acid and sulfuric acid. The solubility of sulfamethazine in sulfuric acid is greater than in hydrochloric acid, but a whiter produce is obtained by the use of the latter and therefore hydrochloric acid is generally more preferred. The preferred mineral acids are those which are of a non-oxidizing nature and capable of producing a solution having a pH from 0.6 to 0.9. Since the acid should be substantially non-oxidizing, it is preferred not to use nitric acid. Also, the acid should be non-toxic and for this reason phosphoric acid is not preferred. The acids are used in the form of dilute aqueous solutions, usually containing from 3 to 15% acid by weight.

Suitable reducing agents for addition to the acid solution of the crude sulfamethazine according to the invention are the water soluble inorganic reducing agents effectve in acidic solution, including the alkali metal (including ammonium) sulfites, hydrosulfites, hydrosulfides, thiosulfates, and sulfides. Of these, the alkali thiosulfates have been found to be the most effective, and they are therefore preferred. The reducing agent is added in a relatively small but effective amount, generally in a concentration of, e. g., from 0.5% to 5% of the weight of the crude sulfamethazine.

The activated charcoal may be added to the acidic solution of crude sulfamethazine either before or after the reducing agent. A relatively small amount of activated charcoal is sufficient for purposes of the invention. Usually 1% on the weight of the solution is sufficient, and there is generally no advantage in using more than 2%. From 1.2 to 1.5% is preferred. The effectiveness of the reducing agent diminishes with time, and therefore, if the charcoal is added subsequent to the reducing agent, too long a time should not elapse before addition of the charcoal to the acidic solution. Thus, if a period of several hours elapses between the time of addition of the reducing agent and subsequent addition of the charcoal, air oxidation largely destroys the effectiveness of the reducing agent, especially if the solution is agitated during this period.

The addition of the reducing agent to the acidic solution results in formation of colloidal sulfur. This is removed along wth the charcoal in the filtration step. The colloidal sulfur in itself is difficult to remove by filtration, but the charcoal acts as a filter aid, permitting the sulfur to be removed easily, and therefore it is highly advantageous to carry out simultaneously the treatment with charcoal and reducing agent.

It has been found that if the filtrate resulting from the foregoing treatment with reducing agent and activated charcoal is partially neutralized, without actually making the solution neutral, the amount of ash in the finally precipitated pure product is sufficiently low to meet the requirements of the medicinal grade of sulfamethazine. Generally, the ash in the product precipitated in this manner is less than 0.1%. The ash is believed to be principally constituted of iron and iron salts, and by neutralizing to a pH of appreciably less than 6, it has been found that these impurities remain largely in solution, while the pure material is precipitated. Preferably the solution is neutralized to a pH within the range from 2.1 to 5.5. It has also been found that the best results are obtained by using ammonia as the neutralizing agent.

The purified product resulting from the foregoing precess not only has an ash content below the limit specified for the medicinal grade, but also has the required melting point, i. e., within the range 196 to 199° C., and also meets the color standard for the medicinal grade, so that it is suitable for use as a therapeutic agent for human beings.

The following examples are given to illustrate the invention, the parts being by weight.

Example 1

10 parts of crude sulfamethazine are dissolved in 75 parts of 4% hydrochloric acid. When solution is complete, sufficient concentrated ammonium hydroxide is added to bring the pH of the solution within the range 0.6 to 0.9. 1.2 parts of activated charcoal and 0.15 part of sodium thiosulfate are then added. After stirring 30 minutes, the mixture is filtered and the filtrate partially neutralized with ammonia at less than 30° C. to a pH of 2.1 to 5.5. The resultant sulfamethazine is filtered, washed and dried. It melts at 197° C. and is whiter than accepted standards. A yield of 94% is obtained.

Example 2

To 10 parts of crude sulfamethazine are added 28 parts of 15% sulfuric acid and sufficient ammonium hydroxide to bring the pH of the solution to 0.6 to 0.8, then 0.5 part of activated charcoal and 0.2 part of sodium hydrosulfite are added. The mixture is stirred about 20 minutes, filtered and the treatment with decolorizing charcoal repeated. Partial neutralization of the solution to a pH of 2.1 to 5.5 precipitates the purified sulfamethazine. After it is filtered, washed, and dried the white product has a melting point between 196° and 198° C. The yield is 90% of theory.

It should be noted, that the success of the present method in producing a product that meets the purity requirements for a therapeutic agent for human beings is dependent upon having, at the time of the treatment with the reducing agent, an acidic solution having a pH within the range from 0.6 to 0.9. Furthermore, it has been found essential that the pH of the solution at the time of precipitation of the sulfamethazine from the acidic solution be appreciably less than 6, and preferably within the range from 2.1 to 5.5. When these requirements are met the process of the invention is capable of producing economically a consistently pure product, even in large scale commercial operations, unlike the purification methods heretofore employed for sulfamethazine.

A particularly advantageous feature of the invention is that the purification process is highly effective for removing metallic impurities, such as ferric oxide, and organo metallic compounds. This permits iron and stainless steel or other types of equipment to be used, as distinguished from glass or glass lined equipment, in manufacture of the crude. Also, this permits relatively impure sulfaguanidine to be employed as a starting material in making the crude, such as technical grade of sulfaguanidine, which contains ferric oxide and other impurities, as distinguished from the more expensive U. S. P. grade of sulfaguanidine.

Having thus described my invention, what I claim and desire to protect by Letters Patent is:

1. A method of purifying crude sulfamethazine which comprises in combination the steps of dissolving the crude sulfamethazine in a dilute mineral acid selected from the group consisting of hydrochloric acid and sulfuric acid, adjusting the pH of the resulting solution to a value of from 0.6 to 0.9, treating the acidic solution of crude sulfamethazine with a reducing agent that is a water soluble inorganic salt selected from the group consisting of alkali metal sulfites, hydrosulfites, hydrosulfides, thiosulfates, and sulfides, and with activated charcoal, separating the activated charcoal, and adding alkali to the remaining solution to produce a pH within the range from 2.1 to 5.5, whereby there is precipitated purified sulfamethazine.

2. A method of purifying crude sulfamethazine which comprises in combination the steps of dissolving the crude sulfamethazine in dilute hydrochloric acid, adjusting the pH of the resulting solution to a value of from 0.6 to 0.9, treating the acidic solution of crude sulfamethazine with sodium thiosulfate and activated charcoal, removing the activated charcoal, and adding alkali to the remaining solution to produce a pH within the range from 2.1 to 5.5, thereby precipitating purified sulfamethazine.

3. A method of purifying crude sulfamethazine which comprises in combination the steps of dissolving the crude sulfamethazine in dilute hydrochloric acid, adjusting the pH of the resulting solution to a value of from 0.6 to 0.9, treating the acidic solution of crude sulfamethazine with sodium hydrosulfite and activated charcoal, removing the activated charcoal, and adding alkali to the remaining solution to produce a pH within the range from 2.1 to 5.5, thereby precipitating purified sulfamethazine.

4. A method of purifying crude sulfamethazine which comprises in combination the steps of dissolving a crude sulfamethazine containing ferrous and organo metallic impurities in dilute hydrochloric acid, adjusting the pH of the resulting solution to a value of from 0.6 to 0.9, with ammonia, treating the acidic solution of crude sulfamethazine with sodium thiosulfate and activated charcoal, removing the activated charcoal, and adding ammonia to the remaining solution to produce a pH within the range from 2.1 to 5.5, thereby precipitating sulfamethazine substantially free from ferrous and organo metallic impurities.

GEORGE AUSTIN INGHAM.

REFERENCES CITED

The following references are of record in the file of this patent:

UNITED STATES PATENTS

| Number | Name | Date |
| --- | --- | --- |
| 2,407,966 | Sprague | Sept. 17, 1946 |
| 2,417,939 | Kuh et al. | Mar. 25, 1947 |
| 2,430,439 | Winnek et al. | Nov. 4, 1947 |
| 2,435,002 | Hartman et al. | Jan. 27, 1948 |
| 2,484,791 | King et al. | Oct. 11, 1949 |
| 2,521,096 | Richmond | Sept. 5, 1950 |